United States Patent
Umeda et al.

(10) Patent No.: US 11,127,029 B2
(45) Date of Patent: Sep. 21, 2021

(54) CAR SHARING MANAGEMENT DEVICE AND CAR SHARING MANAGEMENT METHOD

(71) Applicant: Toyota Jidosha Kabushiki Kaisha, Toyota (JP)

(72) Inventors: Kazuhiro Umeda, Nisshin (JP); Takumi Fukunaga, Nisshin (JP); Makoto Akahane, Nagoya (JP); Satoshi Usui, Machida (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/226,170

(22) Filed: Dec. 19, 2018

(65) Prior Publication Data
US 2019/0236630 A1 Aug. 1, 2019

(30) Foreign Application Priority Data

Jan. 26, 2018 (JP) ............................. JP2018-011905

(51) Int. Cl.
| G06Q 30/02 | (2012.01) |
| G07F 17/24 | (2006.01) |
| G06Q 50/30 | (2012.01) |
| G06Q 20/12 | (2012.01) |
| G07F 17/00 | (2006.01) |
| G06Q 20/38 | (2012.01) |

(52) U.S. Cl.
CPC ....... *G06Q 30/0207* (2013.01); *G06Q 20/127* (2013.01); *G06Q 20/387* (2013.01); *G06Q 50/30* (2013.01); *G07F 17/0057* (2013.01); *G07F 17/24* (2013.01); *G06Q 2240/00* (2013.01)

(58) Field of Classification Search
CPC ................................................... G07F 17/0057
See application file for complete search history.

(56) References Cited

U.S. PATENT DOCUMENTS

| 6,850,898 | B1* | 2/2005 | Murakami | ............ B60L 53/305 705/13 |
| 10,360,592 | B1* | 7/2019 | Emigh | ............... G06Q 30/0224 |
| 2014/0279713 | A1* | 9/2014 | Caiman | ............... G07F 17/0042 705/418 |
| 2015/0066607 | A1* | 3/2015 | Fiorucci | ............. G06Q 30/0205 705/13 |
| 2016/0364812 | A1* | 12/2016 | Cao | ........................ G06Q 50/30 |

FOREIGN PATENT DOCUMENTS

| JP | 2001-188928 A | 7/2001 |
| JP | 2002-175459 A | 6/2002 |
| JP | 2012-053790 A | 3/2012 |

* cited by examiner

*Primary Examiner* — Azam A Ansari
*Assistant Examiner* — Robert C Johnson
(74) *Attorney, Agent, or Firm* — Dinsmore & Shohl LLP

(57) ABSTRACT

A car sharing management device includes a communication device and an information processing device. The communication device is configured to acquire, from an information terminal owned by a user of a car sharing service, commercial facility information acquired by the information terminal at a commercial facility. The information processing device is configured to determine, based on the commercial facility information, whether the user uses the commercial facility while using the car sharing service. The information processing device is configured to provide the user with a reward in a case where the user uses the commercial facility while using the car sharing service.

4 Claims, 4 Drawing Sheets

| COMMERCIAL FACILITY ID | LOCATION |
|---|---|
| F0001 | XXXXXXXXXXXXXXXXXXX |
| F0002 | YYYYYYYYYYYYYYYYYYY |
| ... | ... |

FIG. 3

| USE TIME | REWARD | CHARGE RATIO |
|---|---|---|
| ONE HOUR OR MORE AND LESS THAN TWO HOURS | COUPON FOR A DISCOUNT OF 1000 YEN AVAILABLE AT COMMERCIAL FACILITY | 0 % |
| TWO HOURS OR MORE AND LESS THAN THREE HOURS | DISCOUNT OF 1000 YEN FROM CAR SHARING FEE | 50 % |
| ... | ... | ... |

52b

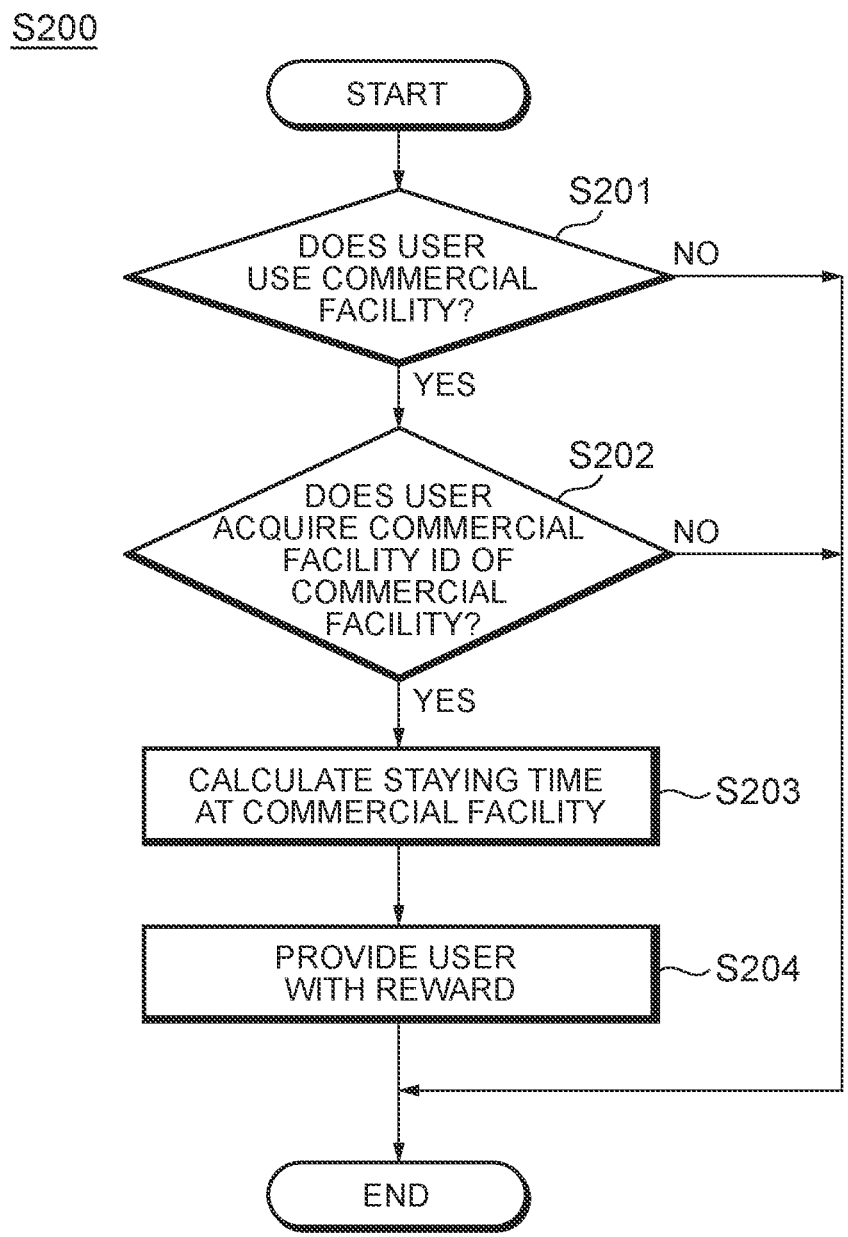

CAR SHARING MANAGEMENT DEVICE AND CAR SHARING MANAGEMENT METHOD

CROSS-REFERENCE TO RELATED APPLICATION

This application claims priority to Japanese Patent Application No. 2018-011905 filed on Jan. 26, 2018, incorporated herein by reference in its entirety.

BACKGROUND

1. Technical Field

The present disclosure relates to a car sharing management device and a car sharing management method.

2. Description of Related Art

A parking lot automatic management device described below is known as a related art. A parking process machine is set in locations such as sales floors of department stores and tenants. The parking process machine has a calculation function that calculates a parking time and a parking fee upon insertion of a parking ticket, a discount function that records discount information on the parking ticket to provide a discount from the parking fee according to an amount of shopping or the like, and a fare adjustment process function that can record a permission for departure on the parking ticket. An exit of the parking lot is provided with a departure permission machine that provides a discount from the parking fee when discount information is recorded on the inserted parking ticket, and that permits departure from the parking lot when permission for departure is recorded thereon (See Japanese Patent Application Publication No. 2001-188928 (JP 2001-188928 A)).

SUMMARY

Meanwhile, in car sharing services, there have not been benefits for car sharing users such as discounts for car sharing fees, even when the users use commercial facilities while using car sharing services. This gives little motivation for car sharing users to stop by and use commercial facilities while using car sharing services, and for using car sharing services for beneficial purposes, causing an issue in that use of commercial facilities and car sharing services are not successfully promoted.

The present disclosure provides a car sharing management device and a car sharing management method that can promote use of commercial facilities and car sharing services.

A first aspect of the present disclosure relates to a car sharing management device. A car sharing management device includes a communication device configured to acquire, from an information terminal owned by a user of a car sharing service, commercial facility information acquired by the information terminal at a predetermined commercial facility, and an information processing device configured to determine, based on the commercial facility information, whether the user uses the predetermined commercial facility while using the car sharing service. The information processing device is configured to provide the user with a reward in a case where the user uses the predetermined commercial facility while using the car sharing service.

According to the first aspect of the car sharing management device, the information processing device may be configured to, based on the commercial facility information, calculate a staying time of the user at the predetermined commercial facility while using the car sharing service, and the information processing device may be configured to provide the user with the reward in accordance with the staying time.

According to the first aspect of the car sharing management device, the information processing device may be configured to provide the user with a discount for a fee of the car sharing service as the reward.

According to the first aspect of the car sharing management device, the information processing device may be configured to provide the user with a discount coupon that is allowed to be used at the predetermined commercial facility as a reward.

According to the first aspect of the car sharing management device, the commercial facility information may include at least one of positional information of the information terminal and identification information used to identify the predetermined commercial facility.

Another aspect of the present disclosure relates to a car sharing management method. The car sharing management method is performed by an information processing device. The car sharing management method includes acquiring, from an information terminal owned by a user of a car sharing service, commercial facility information acquired by the information terminal at a predetermined commercial facility, determining, based on the commercial facility information, whether the user uses the predetermined commercial facility while using the car sharing service, and providing the user with a reward in a case where the user uses the predetermined commercial facility while using the car sharing service.

According to the present disclosure, a car sharing management device and a car sharing management method that can promote use of commercial facilities and car sharing services are provided.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 2 is a diagram of a data configuration illustrating an example of a commercial facility table shown in FIG. 1.

FIG. 3 is a diagram of a data configuration illustrating an example of a reward table shown in FIG. 1.

FIG. 4 is a flowchart describing an example of an operation of the car sharing management device shown in FIG. 1.

DETAILED DESCRIPTION

Figure 1:
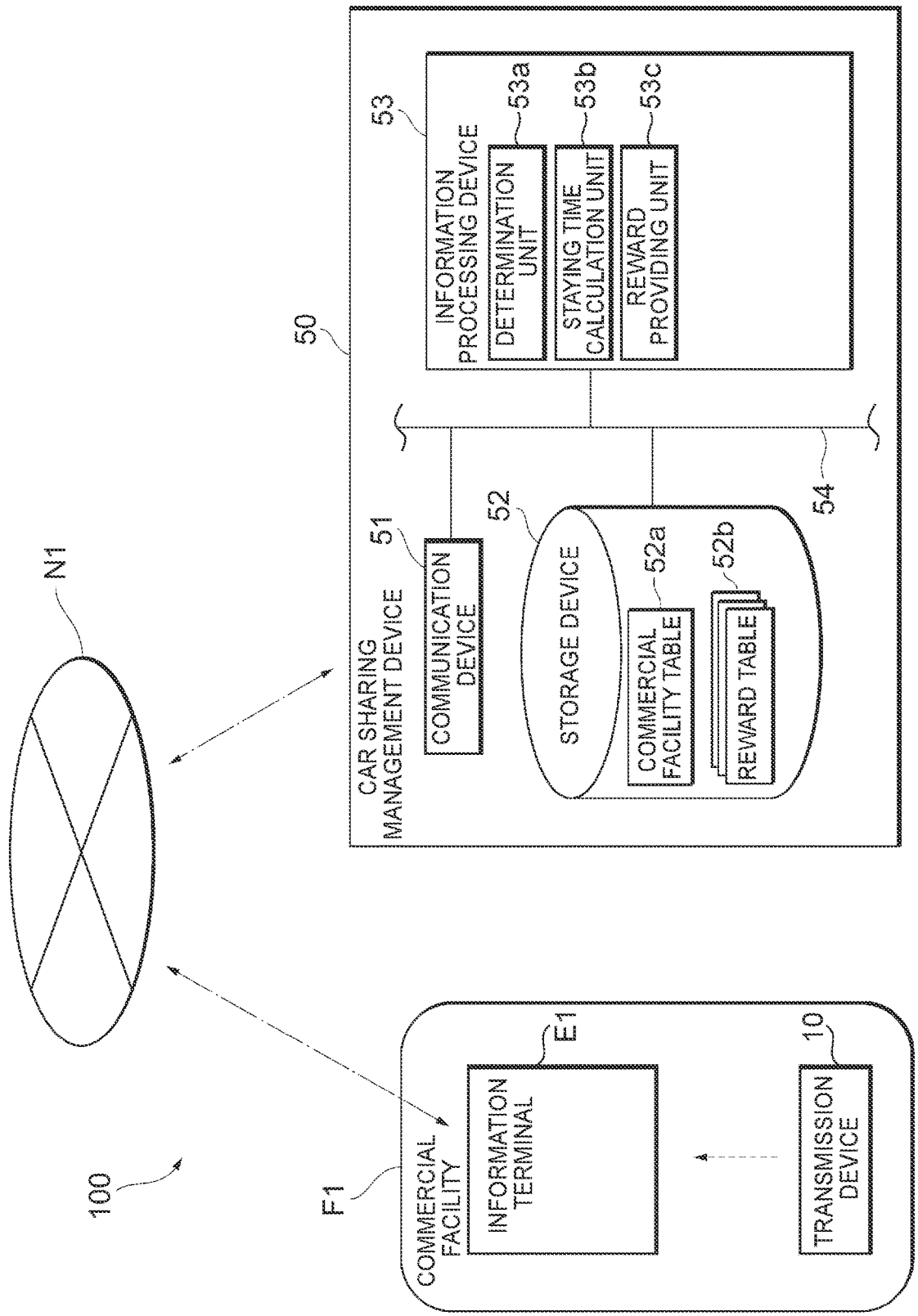
FIG. 1 is a diagram illustrating an example of a schematic configuration of a car sharing management system according to a first embodiment.

Embodiments of the present disclosure will be described below. In the drawings hereafter, the same or similar parts are shown in the same or similar reference signs. The drawings are schematically depicted. The technical range of the present disclosure shall not be limited to the embodiments.

FIGS. 1 to 4 illustrate a car sharing management device and a car sharing management system according to a first embodiment. First, a schematic configuration of the car sharing management system according to the first embodiment will be described with reference to FIGS. 1 to 3. FIG. 1 is a diagram illustrating an example of a schematic configuration of a car sharing management system 100 according to the first embodiment. FIG. 2 is a diagram of a data configuration illustrating an example of a commercial facility table 52a shown in FIG. 1. FIG. 3 is a diagram of a data configuration illustrating an example of a reward table 52b shown in FIG. 1.

As illustrated in FIG. 1, the car sharing management system 100 is provided with a transmission device 10 set in a predetermined commercial facility F1. The car sharing management system 100 is also provided with a car sharing management device 50.

The car sharing management device 50 is configured to be communicable with an information terminal E1 owned by a car sharing user via a communication network N1.

The information terminal E1 is a portable information communication unit including, for example, a smartphone, a cellular phone, a personal digital assistant (PDA), a tablet terminal, a portable game console, a portable music player, and a wearable terminal. The information terminal E1 is configured to communicate with the car sharing management device 50 via the communication network N1 based on a predetermined mobile communication method.

The information terminal E1 can acquire positional information in accordance with a position measured at a base station (not illustrated) in the communication network N1. The information terminal E1 may be provided with a global positioning system (GPS) receiver and may acquire positional information by a position measured the GPS, for example.

The information terminal E1 stores, in advance, various programs executed by a processor (not illustrated) such as a central processing unit (CPU) and data required for executing the programs in a memory (not illustrated) such as a read only memory (ROM), a random access memory (RAM), and a buffer memory. A user ID of a user is also stored in the memory. The user ID is a unique ID provided individually to all users using the car sharing management system 100, for example.

The information terminal E1 is configured to transmit the positional information and the user ID described above to the car sharing management device 50 via the communication network N1. The information terminal E1 is configured to receive radio signals from the transmission device 10.

The transmission device 10 is configured to transmit identification information used to identify the commercial facility F1. The transmission device 10 is, for example, a beacon. The identification information transmitted is, for example, a commercial facility ID provided uniquely and individually to a plurality of commercial facilities F1. The information terminal E1 is configured to transmit the commercial facility ID received from the transmission device 10 to the car sharing management device 50 via the communication network N1.

The present embodiment shows an example where a single commercial facility F1 is provided as a predetermined commercial facility F1, and a single transmission device 10 is set in the commercial facility F1. However, the embodiment is not limited to this. A plurality of commercial facilities F1 may be provided. A plurality of transmission devices 10 may be set in the commercial facility F1, for example, by setting a transmission device 10 around each cash register.

The present embodiment shows an example where the information terminal E1 receives the commercial facility ID from the transmission device 10 set in the commercial facility F1, and transmits the commercial facility ID to the car sharing management device 50. However, the embodiment is not limited to this. For example, the information terminal E1 may be provided with a camera, read a coded commercial facility ID set in a predetermined commercial facility with the camera, and transmit the read commercial facility ID to the car sharing management device 50. The commercial facility ID is coded by a one-dimensional code such as a bar code or a two-dimensional code such as a QR code (registered trademark). The user may use the camera of the information terminal E1 to capture an image of a receipt given when using a predetermined commercial facility, and transmit the captured image to the car sharing management device 50. In this case, the car sharing management device 50 may read, based on the image, commercial facility identification information and sales information that identify the commercial facility. The positional information of the information terminal E1, the commercial facility ID, and the commercial facility identification information and the sales information described above may be considered as examples of "commercial facility information" of the present disclosure.

The car sharing management device 50 is provided with a communication device 51, a storage device 52, and an information processing device 53, for example. The car sharing management device 50 is also provided with a bus 54 configured to transmit signals and data between devices in the car sharing management device 50.

The communication device 51 communicates with the information terminal E1 of the user. The communication device 51 is configured to communicate with the information terminal E1 via the communication network N1 based on the predetermined communication method.

Specifically, the communication device 51 receives the positional information and the user ID from the information terminal E1 of the car sharing user at predetermined time intervals. The communication device 51 adds, to the received positional information, receipt date and time information that indicates the date and time when the information is received and causes the storage device 52 to store the information for each user ID. Thus, the positional information is acquired from the information terminal E1 of the user.

Instead of the addition of the receipt date and time information to the positional information received by the car sharing management device 50, the information terminal E1 may add, to the positional information, acquisition date and time information that indicates the date and time when the positional information is acquired by the information terminal E1, and transmit the information to the car sharing management device 50.

The communication device 51 receives the commercial facility ID and the user ID from the information terminal E1 of the car sharing user that has received the commercial facility ID from the transmission device 10. The communication device 51 adds, to the received commercial facility ID, the receipt date and time information that indicates the date and time when the information is received, and causes the storage device 52 to store the information for each user ID. Thus, the commercial facility ID is acquired from the information terminal E1 of the user.

In addition to or instead of the addition of receipt date and time information to the positional information received by the car sharing management device 50, the information terminal E1 may add, to the positional information, the acquisition date and time information that indicates the date and time when the positional information is acquired by the information terminal E1 and transmit the information to the car sharing management device 50. Similarly, in addition to or instead of the addition of receipt date and time information to the commercial facility ID received by the car sharing management device 50, the information terminal E1 may add, to the commercial facility ID, the acquisition date and time information when the commercial facility ID is acquired by the information terminal E1 and transmit the information to the car sharing management device 50.

The storage device 52 is configured to store programs and data or the like. The storage device 52 stores, in advance, various programs executed by the information processing device 53 and data required for executing the programs, or the like.

The storage device 52 stores a commercial facility table 52a in advance. The commercial facility table 52a is data used to determine whether the car sharing user uses a predetermined commercial facility.

As illustrated in FIG. 2, the commercial facility table 52a stores a combination of the commercial facility ID and a location as one record, for example. The commercial facility ID and the location can thus be identified for each commercial facility.

Furthermore, the storage device 52 stores a reward table 52b for each predetermined commercial facility in advance. The reward table 52b is data used for providing the car sharing user with a reward.

As illustrated in FIG. 3, the reward table 52b stores a combination of a use time, the reward, and a charge ratio as one record, for example. As an example, when the use time at the commercial facility F1 is "one hour or more and less than two hours", the car sharing user using the commercial facility F1 is provided with "a coupon for a discount of 1000 yen available at the commercial facility" that can be used at the commercial facility F1 as the reward. With respect to the reward, the charge ratio charged to the commercial facility F1 is "zero %". As another example, when the use time at the commercial facility F1 is "two hours or more and less than three hours", the car sharing user using the commercial facility F1 is provided with "a discount of 1000 yen from the car sharing fee" as the reward. With respect to the reward, the charge ratio charged to the commercial facility F1 is "50%".

Referring back to FIG. 1, the information processing device 53 is configured to control the operation of the devices of the car sharing management device 50 including the communication device 51 and the storage device 52. The information processing device 53 can be configured to include, for example, the processor such as the CPU and the memory such as the ROM, the RAM, and the buffer memory. The information processing device 53 is provided with, as its functional configuration, a determination unit 53a, a staying time calculation unit 53b, and a reward providing unit 53c, for example.

The determination unit 53a determines, based on the positional information, whether the user of the user ID acquired along with the positional information uses the commercial facility F1 while using the car sharing service. Specifically, first, the determination unit 53a refers to the use information (not illustrated) of the car sharing service that the user of the user ID uses, and selects, among a plurality of pieces of positional information stored in the storage device 52 for each user ID, the positional information of which the receipt date and time falls within a use start time and a use end time of the car sharing service used by the user.

The determination unit 53a then compares the selected positional information and the information of location of the commercial facility table 52a stored in the storage device 52. The determination unit 53a determines that the user uses the commercial facility F1 when the two pieces of information match each other or a distance between positions indicated by the two pieces of information is equal to or less than a predetermined value. In contrast, when the distance between the positions indicated by the two pieces of information is larger than the predetermined value after comparing the selected positional information and the information of location of the commercial facility table 52a stored in the storage device 52, the determination unit 53a determines that the user does not use the commercial facility F1.

The determination unit 53a may determine, based on the commercial facility ID acquired by the communication device 51, whether the user of the user ID acquired along with the commercial facility ID uses the commercial facility F1 while using the car sharing service. Specifically, first, the determination unit 53a refers to the use information of the car sharing service that the user of the user ID uses, and selects, among a plurality of commercial facility IDs stored in the storage device 52 for each user ID, the commercial facility ID of which the receipt date and time falls within the use start time and the use end time of the car sharing service used by the user. The determination unit 53a then compares the selected commercial facility ID and the commercial facility ID of the commercial facility table 52a stored in the storage device 52. The determination unit 53a determines that the user uses the commercial facility when the two IDs match each other. In contrast, when the selected commercial facility ID and the commercial facility ID of the commercial facility table 52a stored in the storage device 52 do not match each other, or when the communication device 51 has not acquired the commercial facility ID, the determination unit 53a determines that the user does not use the predetermined commercial facility.

The staying time calculation unit 53b calculates, based on the positional information, the staying time of the user of the user ID acquired along with the positional information, that is, how long the user stays at the commercial facility FP while using the car sharing service. For example, the staying time calculation unit 53b calculates the staying time of the user at the commercial facility F1 while using the car sharing service based on the receipt date and time information added to the positional information. Specifically, as with the determination unit 53a, first, the staying time calculation unit 53b refers to the use information of the car sharing service that the user of the user ID uses, and selects, among the plurality of pieces of positional information stored in the storage device 52 for each user ID, the positional information of which the receipt date and time falls within a use start time and a use end time of the car sharing service used by the user. The staying time calculation unit 53b then compares the selected positional information and the information of location of the commercial facility table 52a stored in the storage device 52. The staying time calculation unit 53b selects the plurality of pieces of positional information at which the two pieces of information match each other, or the plurality of pieces of positional information at which the distance between positions indicates by the two pieces of information is equal to or less than the predetermined value. The staying time calculation unit 53b can calculate the staying time of the user at the commercial facility F1 by obtaining the difference between the receipt date and time added to the first positional information, that is the oldest positional information, and the receipt date and time added to the last positional information, that is the latest positional information, among the selected pieces of positional information.

The staying time calculation unit 53b may calculate, based on the commercial facility ID, the staying time of the user of the user ID acquired along with the commercial facility ID at the commercial facility F1 while using the car sharing service. For example, the staying time calculation unit 53b calculates the staying time of the user at the commercial facility F1 while using the car sharing service based on the receipt date and time information added to the commercial facility ID. Specifically, as with the determination unit 53a, first, the staying time calculation unit 53b refers to the use information of the car sharing service that the user of the user ID uses, and selects, among the plurality of commercial facility IDs stored in the storage device 52 for each user ID, the commercial facility IDs of which the receipt date and time falls within the use start time and the use end time of the car sharing service used by the user. The staying time calculation unit 53b can calculate the staying time of the user at the commercial facility F1 by obtaining the difference between the receipt date and time added to the first commercial facility ID, that is the oldest commercial facility ID, and the receipt date and time added to the last commercial facility ID, that is the latest commercial facility ID, among the selected commercial facility IDs.

The reward providing unit 53c provides the user with the reward in a case where the user of the user ID acquired along with the positional information or the commercial facility ID uses the commercial facility F1 while using the car sharing service. Specifically, the reward providing unit 53c provides the user of the user ID with the reward in accordance with the staying time calculated by the staying time calculation unit 53b based on the reward table 52b stored in the storage device 52. For example, when the reward is a discount coupon, the reward providing unit 53c sends an e-mail including an image of the discount coupon, link information, and a two-dimensional code to an e-mail address of the user of the user ID. For example, when the reward is a discount for a car sharing fee, the discount amount is deducted from the car sharing fee and the car sharing use information described above is updated.

Next, an overall operation of the car sharing management device 50 is described with reference to FIG. 4. FIG. 4 is a flowchart describing an example of an operation of the car sharing management device 50 shown in FIG. 1.

For example, when or after the user of the car sharing management system 100 returns a vehicle that the user uses, the car sharing management device 50 executes the reward providing process S200 illustrated in FIG. 4.

Note that in the description below, the communication device 51 of the car sharing management device 50 acquires the positional information from the information terminal E1 of the user a plurality of times while the user is using the car sharing service, adds the receipt date and time information for each positional information, and causes the storage device 52 to store the information.

First, the determination unit 53a refers to the positional information and the commercial facility table 52a stored in the storage device 52, and determines whether the car sharing user uses the commercial facility F1 while using the car sharing service (S201).

In a case where it is determined in step S201 that the car sharing user uses the commercial facility F1 while using the car sharing service, it is highly probable that the car sharing user stops by the commercial facility F1. Meanwhile, the positional information may not be enough to prove that the user uses the commercial facility F1. Therefore, the determination unit 53a further refers to the commercial facility ID and the commercial facility table 52a stored in the storage device 52, and determines whether the car sharing user acquires the commercial facility ID of the commercial facility F1 while using the car sharing service (S202).

In a case where it is determined in step S202 that the car sharing user acquires the commercial facility ID of the commercial facility F1 while using the car sharing service, it is highly probable that the car sharing user uses the commercial facility F1. Thus, the staying time calculation unit 53b refers to the positional information and the commercial facility table 52a stored in the storage device 52, and calculates the staying time of the car sharing user at the commercial facility F1 while using the car sharing service (S203).

Next, the reward providing unit 53c refers to the reward table 52b stored in the storage device 52, and provides the user of the user ID with a reward in accordance with the staying time calculated in step S203 (S204). In a case where it is determined that it is highly probable that the car sharing user uses the commercial facility F1 in step S202, the reward providing unit 53c may provide the user with the reward regardless of the staying time of the user at the commercial facility F1.

After step S204, the car sharing management device 50 ends the reward providing process S200.

In a case where it is determined in step S201 that the car sharing user does not use the commercial facility F1 while using the car sharing service, or in a case where it is determined in step S202 that the car sharing user does not acquire the commercial facility ID of the commercial facility F1 while using the car sharing service, the car sharing management device 50 ends the reward providing process S200 without providing the user with the reward.

In the present embodiment, the positional information of the information terminal E1 and the commercial facility ID are used as the commercial facility information. However, the embodiment is not limited to this. The commercial facility information only needs to be information acquired by the information terminal E1 at the commercial facility F1. As described above, the commercial facility information may be the commercial facility identification information and the sales information read from the receipt image, for example. The commercial facility information is not limited to the combination of the positional information of the information terminal E1 and the commercial facility ID, and may be either one of the positional information of the commercial facility and the commercial facility ID.

Thus, according to the car sharing management device 50 and the car sharing management method of the present embodiment, the commercial facility information is acquired from the information terminal E1 owned by the car sharing user, it is determined whether the user uses the commercial facility F1 while using the car sharing service based on the commercial facility information, and the reward is provided to the user in a case where the user uses the commercial facility F1 while using the car sharing service. This may raise motivation for car sharing users to use the commercial facility F1 while using the car sharing service, and to use the car sharing service for a reward in return. This can promote use of the commercial facility F1 and the car sharing service.

The above described embodiment is intended to help understand the present disclosure and is not intended to limit a gist of the present disclosure. The components of the embodiment, and the arrangement, materials, conditions, shapes, and sizes of the components are not limited to those illustrated, but can be appropriately changed. In addition, the configurations shown in different embodiments may be replaced or combined in part.

What is claimed is:

1. A car sharing management device comprising:
   a communication device configured to acquire, from an information terminal owned by a user of a car sharing service, positional information of the information terminal and an image of a receipt associated with a predetermined commercial facility acquired by the information terminal at the predetermined commercial facility; and
   an information processing device configured to determine, based on the image of the receipt, a commercial facility ID associated with the predetermined commercial facility, the information processing device configured to determine, based on the positional information and the commercial facility ID, whether the user uses the predetermined commercial facility while using the car sharing service, the information processing device configured to, based on the image of the receipt, the positional information, and the commercial facility ID, calculate a staying time of the user at the predetermined commercial facility while using the car sharing service, the information processing device configured to provide the user with a reward in accordance with the staying time in a case where the user uses the predetermined commercial facility while using the car sharing service.

2. The car sharing management device according to claim 1, wherein the information processing device is configured to provide the user with a discount for a fee of the car sharing service as the reward.

3. The car sharing management device according to claim 1, wherein the information processing device is configured to provide the user with a discount coupon that is allowed to be used at the predetermined commercial facility as a reward.

4. A car sharing management method performed by an information processing device, the car sharing management method comprising:
   acquiring, from an information terminal owned by a user of a car sharing service, positional information of the information terminal and an image of a receipt associated with a predetermined commercial facility acquired by the information terminal at the predetermined commercial facility;
   determining, based on the image of the receipt, a commercial facility ID associated with the predetermined commercial facility;
   determining, based on the positional information and the commercial facility ID, whether the user uses the predetermined commercial facility while using the car sharing service;
   calculating, based on the image of the receipt, the positional information, and the commercial facility ID, a staying time of the user at the predetermined commercial facility while using the car sharing service; and
   providing the user with a reward in accordance with the staying time in a case where the user uses the predetermined commercial facility while using the car sharing service.

* * * * *